(12) United States Patent
Sawada et al.

(10) Patent No.: US 10,554,522 B2
(45) Date of Patent: Feb. 4, 2020

(54) MASTER DEVICE, SLAVE DEVICE, ERROR MONITORING SYSTEM, AND CONTROL METHOD AND CONTROL PROGRAM OF MASTER DEVICE

(71) Applicant: OMRON Corporation, Kyoto (JP)

(72) Inventors: Shigenori Sawada, Takatsuki (JP); Taishi Kawaguchi, Kyoto (JP); Yasushi Yamawaki, Kasatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/381,133

(22) Filed: Dec. 16, 2016

(65) Prior Publication Data

US 2017/0250883 A1 Aug. 31, 2017

(30) Foreign Application Priority Data

Feb. 26, 2016 (JP) ................. 2016-036446

(51) Int. Cl.
*H04L 12/26* (2006.01)
*H04L 29/08* (2006.01)

(52) U.S. Cl.
CPC ......... *H04L 43/0847* (2013.01); *H04L 43/04* (2013.01); *H04L 67/125* (2013.01)

(58) Field of Classification Search
CPC ..... H04L 43/0847; H04L 43/04; H04L 41/06; H04L 41/00; H04L 67/125
See application file for complete search history.

(56) References Cited

U.S. PATENT DOCUMENTS

| | | | | |
|---|---|---|---|---|
| 7,266,726 B1* | 9/2007 | Ladd | ................... | G06F 11/2268 714/27 |
| 7,554,929 B1* | 6/2009 | Omar | ..................... | H04L 43/10 370/252 |
| 9,832,082 B2* | 11/2017 | Dade | ..................... | H04L 43/028 |
| 2004/0113814 A1* | 6/2004 | Lochner | ................ | G08C 19/02 340/870.18 |
| 2004/0179699 A1* | 9/2004 | Moeller | .................... | H04S 3/02 381/73.1 |

(Continued)

FOREIGN PATENT DOCUMENTS

| | | |
|---|---|---|
| CN | 101091353 | 12/2007 |
| CN | 101263499 | 9/2008 |

(Continued)

OTHER PUBLICATIONS

"Search Report of Europe Counterpart Application", dated Jul. 4, 2017, p. 1-p. 7.

(Continued)

*Primary Examiner* — Scott B Christensen
(74) *Attorney, Agent, or Firm* — JCIPRNET (57) ABSTRACT

A master device, slave device, error monitoring system, and control method and control program of master device are provided. According to the present invention, in the connection less communication, no matter in operation or not, the generation of the communication errors can be monitored. The master device comprises: an indication sending part, sending an indication enabling a plurality of slave devices to send an error log; an error log receiving part, receiving the error logs; and a storing part, storing the error logs by corresponding to each of the slave devices.

13 Claims, 5 Drawing Sheets

(56) References Cited

U.S. PATENT DOCUMENTS

| | | | | |
|---|---|---|---|---|
| 2006/0136784 A1* | 6/2006 | Prescott | .............. | G06F 11/0748 |
| | | | | 714/38.11 |
| 2006/0156115 A1* | 7/2006 | Kim | ........................ | H04L 41/06 |
| | | | | 714/724 |
| 2015/0248126 A1 | 9/2015 | Oh et al. | | |
| 2017/0068240 A1* | 3/2017 | Abe | ........................ | G05B 19/05 |

FOREIGN PATENT DOCUMENTS

| | | |
|---|---|---|
| EP | 2725748 | 4/2014 |
| JP | H09186687 | 7/1997 |
| JP | H11127155 | 5/1999 |
| JP | 2001203728 | 7/2001 |
| JP | 2008177796 | 7/2008 |
| JP | 2009202720 | 9/2009 |
| JP | 2011188322 | 9/2011 |
| JP | 2012-195653 | 10/2012 |
| WO | 2012087901 | 6/2012 |
| WO | 2014009116 | 1/2014 |

OTHER PUBLICATIONS

Office Action of China Counterpart Application, with English translation thereof, dated Nov. 21, 2018, pp. 1-25.
"Notification of Reasons for Refusal of Japan Counterpart Application," dated Aug. 28, 2018, with English translation thereof, p. 1-p. 6.
"Office Action of Japan Counterpart Application", dated Jan. 29, 2019, with English translation thereof, p. 1-p. 6.
"Office Action of China Counterpart Application," dated Jul. 1, 2019, with English translation thereof, p. 1-p. 22.

* cited by examiner

| Slave device 1 | 13 |
|---|---|
| Error type | Error counting number |
| Error A | 0 |
| Error B | 128 |
| Error C | 0 |

| Slave device 2 | 13 |
|---|---|
| Error type | Error counting number |
| Error A | 0 |
| Error B | 0 |
| Error C | 255 |

| Slave device 3 | 13 |
|---|---|
| Error type | Error counting number |
| Error A | 0 |
| Error B | 0 |
| Error C | 20 |

FIG. 3

|  | Final log acquiring moment | Accumulated number of error A | Accumulated number of error B | Accumulated number of error C |
|---|---|---|---|---|
| Slave device 1 | 2016/2/10 12:00:00 | 0 | 1500 | 0 |
| Slave device 2 | 2016/2/10 12:00:00 | 0 | 0 | 2000 |
| Slave device 3 | 2016/2/10 12:00:00 | 0 | 0 | 300 |

MASTER DEVICE, SLAVE DEVICE, ERROR MONITORING SYSTEM, AND CONTROL METHOD AND CONTROL PROGRAM OF MASTER DEVICE

CROSS-REFERENCE TO RELATED APPLICATION

This application claims the priority benefits of Japan patent application no. JP 2016-036446, filed on Feb. 26, 2016. The entirety of the above-mentioned patent application is hereby incorporated by reference herein and made a part of this specification.

BACKGROUND OF THE INVENTION

1. Field of the Invention

The present invention relates to a master device, a slave device, etc., which perform connectionless communication.

2. Description of Related Art

Many industrial network systems are designed in the past, the industrial network systems contain slave devices performing data collection and control of the production device arranged in a workshop and a master device for managing a plurality of slave devices in a concentrating manner. The topology structure of the master device and the slave devices are diversified according to the production device subjected to the data collection and control of the slave devices or a relation of cooperation or wiring, etc., among the slave devices.

The master device and the slave devices perform the connectionless communication by means of EtherCAT (Ethernet for Control Automation Technology) (registered trademark). Besides, regarding the serial connection part of the topology structure of the master device and the slave devices, the frames containing the data to be sent are received and transmitted through reciprocation on one transmission path. Specifically speaking, the frames flowing to the transmission path from the master device arrive at the slave device at the terminal through the slave devices serially connected to the downstream of the master device. Then, the frames are retraced in the slave device at the terminal to return back to the master device from the slave devices according to the sequence opposite to the path to the slave devices.

Therefore, if the communication errors such as disconnection or damage to the frames and link disappearance are generated in the communication between the master device and the plurality of slave devices, the frames cannot return back to the side of the master device, and thus the slave machine causing the error cannot be judged.

In order to solve the problem, there is developed a technology: by controlling the opening and closing of the ports of the plurality of slave devices, whether the frames have returned is checked under the condition that each slave device is set to be the slave device of a network terminal, thereby detecting the connection abnormality of each slave device (patent document 1).

EXISTING TECHNICAL DOCUMENT

Patent Document

Patent document 1: JP patent laid open No. 2012-195653 gazette (published on Oct. 11, 2012)

SUMMARY OF THE INVENTION

In addition, in the invention recorded by the patent document 1, the master device is subjected to communication test after converted to a "test mode" different from the production procedure of an industrial network system, such that the connection abnormality of the slave device is determined, and the master device cannot perform monitoring on the error generated during operation in the industrial network.

In view of the problem, the present invention aims to implement a master device, etc., which can determine the generating part of the communication error no matter whether the industrial network is in operation or not.

In order to solve the problem, the master device of the present invention has the following structure: that is, a master device, communicating with a plurality of slave devices by a connectionless communication mode, wherein the plurality of slave devices detect whether a communication error exists, and the master device comprises: an indication sending part, sending an indication for enabling the plurality of slave devices to send an error information, wherein the error information represents whether the communication error exists; an information receiving part, receiving the error information sent from the plurality of slave devices respectively according to the indication sent from the indication sending part; and a log storing part, enabling the error information received by the information receiving part corresponding to each slave device to be stored into the storing part.

In order to solve the problem, a control method of the master device of the present invention is the following method: that is, a control method of a master device, the master device communicates with a plurality of slave devices by a connectionless communication mode, wherein the plurality of slave devices detect whether a communication error exists, and the control method of a master device comprises: an indication sending step, sending an indication for enabling the plurality of slave devices to send an error information, wherein the error information represents whether the communication error exists; an information receiving step, receiving the error information sent from the plurality of slave devices respectively according to the indication sent in the indication sending step; and a log storing step, enabling the error information received in the information receiving step corresponding to each slave device to be stored into the storing part.

According to the structure or method, the master device collects error information from the plurality of slave devices, and therefore, the error information can be stored corresponding to each slave device. Therefore, under the condition that any one of the slave devices in operation generates the communication error, the master device can know where the communication error is generated. That is, no matter the slave devices are in operation or not on the network, the master device can determine the generating part of the communication error in the slave devices.

In the master device, it can also be that the indication sending part sends the indication in a regulated time interval.

According to the structure, the master device collects the error information from the plurality of slave devices from the information receiving part in a regulated period, therefore, whether each slave device has an error can be monitored in a regulated period. Therefore, the master device can monitor whether the communication error is generated due to time lapse as well as moving of the generating part.

In the master device, it can also be that the information receiving part receives a number of occurrence of the communication error detected from the slave devices as the error information.

According to the structure, the master device collects the number of occurrence of the error by using the information receiving part, and therefore, the generation of the communication error in each of the plurality of slave devices can be quantitatively monitored. Therefore, for example, the slave device with frequent errors can be determined, therefore, the generating part of the error can be more accurately determined.

In the master device, it can also be that the log storing part stores an accumulated value of the number of occurrence of the communication error.

According to the structure, the master device records the accumulated value of the number of occurrence of the communication error in the storing part, therefore, the number of occurrence of each of the slave devices can be more accurately monitored. Specifically speaking, even under the condition that the counting number of the occurrence is initialized due to some factors, for example, the power source of the slave devices is OFF, the master device can still accumulate and record the number of occurrence of the errors, and thus continues to monitor the errors. In other words, under the condition that the counting number of the occurrence of the errors in the slave device has an upper limit value, the counting number in the slave device can be initialized, and therefore, the errors can be periodically monitored for a long time.

In the master device, it can also be that, the log storing part associates the error information received by the information receiving part with the moment when the information receiving part receives the error information or the moment when the error information is acquired from the slave device for storage.

According to the structure, the generating moment of the error can be inferred by confirming the moment associated with the error information stored in the storing part.

In the master device, it can also be that the information receiving part receives the error information of each type of communication errors from the slave devices, and the log storing part stores the error information by corresponding to each type of the communication errors.

According to the structure, the storage part stores the error information by corresponding to each type of the communication errors, and therefore, the master device can determine the generating part of the error together with the type of the generated error.

In the master device, it can also be that, the storing part stores the data of a user program, the user program is a program manufactured by the user, and is a program specifying the sending start and end moments of the indication and the sending time interval of the indication, the indication sending part starts to send the indication at the sending start moment regulated by the user program, periodically sends the indication at the time interval regulated by the user program, and ends the periodically sending the indication at the sending end moment regulated by the user program.

According to the structure, the indication sending part starts and ends the collection of the error information from the plurality of slave devices at the moment freely decided by the user program manufactured by the user. Besides, the indication sending part collects the error information at the time interval freely decided by the user program from the collecting start moment to the end moment. Therefore, the master device can acquire the error information in the freely decided period at freely decided interval. Therefore, the degree of freedom of the collecting period and collecting interval of the error information can be improved.

In order to solve the problem, the slave device of the present invention has the following structure, that is, a slave device detects whether the communication error exists, and communicates with a master device in a connectionless communication mode, and the slave device comprises: an indication receiving part, receiving a sending indication of an error information from the master device, wherein the error information represents whether the communication error exists; and an information sending part, sending the error information to the master device according to the sending indication received by the receiving part.

According to the structure, the slave device can send the error information for determining the generating part of the communication errors to the master device no matter whether in operation on the network or not.

In order to solve the problem, an error monitoring system of the present invention has the following structure, that is, comprises the master device and a plurality of the slave devices.

According to the structure, the effects same as those of the master device and the slave devices are realized.

The master device and the slave device can be realized by a computer, at this point, the computer is treated as each part (software factor) of the master device and the slave device is enabled to act, and a recording medium which realizes the master device and the slave device and a control program of the master device and the slave device, records the control program and is cable of being read by the computer also belongs to the scope of the present invention.

According to the present invention, no matter in the operation in the industrial network or not, the generating part of the communication errors can be determined.

DESCRIPTION OF THE EMBODIMENTS

<System Generalization>

Figure 2:
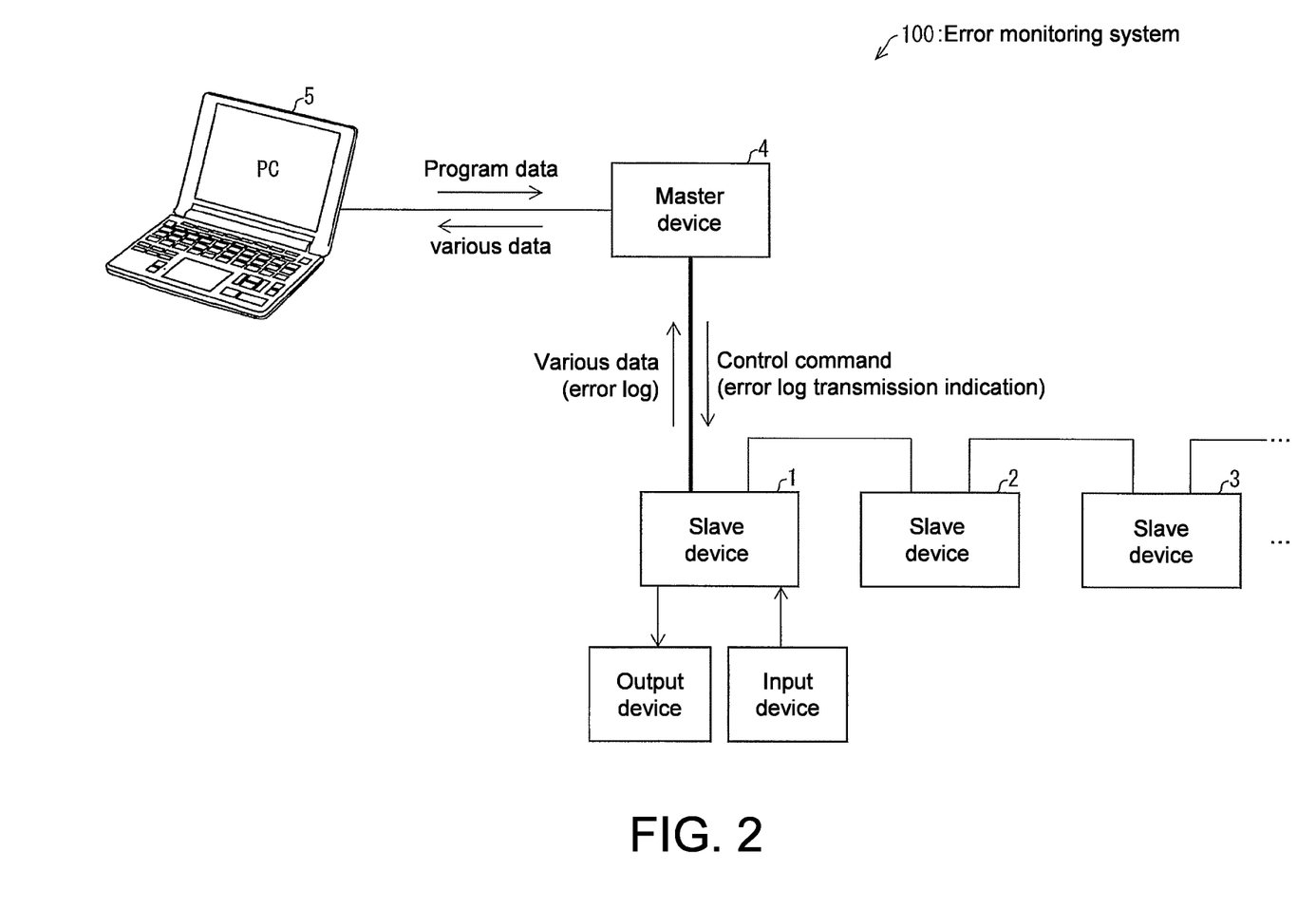
FIG. 2 is a diagram showing a generalization of the error monitoring system.

At first, the system structure and its generalization of the error monitoring system of the present embodiment are explained. FIG. 2 is a diagram showing the generalization of the error monitoring system 100. The error monitoring system 100 as shown in the drawing comprises a Personal Computer (PC) 5, a master device 4 and a plurality of slave devices (slave devices 1-3). In addition, each slave device can be connected to any one or both more than one input device and more than output device.

The PC5 is in communication with the master device in a wired or wireless manner. In the other aspect, the master device 4 and the slave device 1 are connected by a cable suitable for communication of an (EtherCAT (Ethernet for Control Automation Technology) registered trademark), and the connectionless communication is performed by using the EtherCAT communication standards. The slave device 1 and the slave device 2 as well as the slave device 2 and the slave device 3 are also connected with the same cable, and communication is performed by using the EtherCAT communication standards. In the communication of the master device 4 and the slave devices 1-3, the master device 4 as an upstream side works as an EtherCAT master, and the slave device 1 to slave device 3 work as EtherCAT slave devices. Hereinafter, the communication using the EtherCAT communication standards is short for "EtherCAT communication". The slave device (the slave device 1 in FIG. 2) and the input device or output device are properly connected in a wired or wireless manner.

In addition, in the present embodiment, the condition that the three slave devices 1-3 are serially connected to the master device 4 as shown in FIG. 2 is used for explaining, but the topology structure of the slave device directly or indirectly connected to the master device 4 is not particularly defined. The error monitoring system 100 can also adopt any topology structure in a serial shape, ring shape, tree shape or star shape according to the cooperation or wiring condition among the slave devices. Besides, if a plurality of slave devices exist, the number of the slave devices can be any number.

Herein, each device is simply explained. The PC5 is a user program which is manufactured according to the input operation of the user and executed by the master device 4, and sends to the master device 4. Besides, the PC5 also collects various data from the master device 4 and edits and displays the data.

The slave devices 1-3 are buttons or switches connected to the devices, and devices collecting data of the input devices such as various detection devices or determining devices and the like, and are devices for controlling the output devices such as a motor or lamp. The slave devices 1-3 record the number of occurrence of each type of communication errors generated in the device as the error logs (error information), and transmit to the master device 4 according to the indication from the master device 4. The error logs are explained in detail in the following text.

The master device 4 is a Programmable Logic Controller (PLC) for sequence controlling. The master device 4 transmits a control command to the slave devices 1-3 through EtherCAT communication, and thus controls the slave devices 1-3, and receives various data from the slave devices 1-3, thereby monitoring the state of the slave devices 1-3. These controls and state monitoring are executed based on the user program received from the PC5. Specifically speaking, the master device 4 collects error logs from the slave devices 1-3, and records the accumulated data, i.e., the accumulated number of occurrence of error logs.

The error monitoring system 100 is the system as follows, that is, the error logs recorded from the slave devices 1-3 are collected for regulated number of times, the accumulated error logs obtained by accumulating the number of occurrence of the errors contained in the collected error logs are manufactured by corresponding to each slave device, therefore, the errors generated by the slave devices 1-3 are quantitatively and qualitatively monitored. Hereinafter, the generalization of the processing flow of the error monitoring system 100 is explained.

The PC5 manufactures a program containing the regulation related to the error log collection in the master device 4, i.e., the user program, and sends to the master device 4. In addition, the user program is explained in detail in the following text.

The master device 4 indicates the slave devices 1-3 to transmit the error logs (transmission indication of the error logs) according to the received regulation of the user program. Specifically speaking, the master device 4 manufactures the frames containing the transmission indication of the error logs and according with the EtherCAT communication standards (EtherCAT frames, short for frames hereinafter) and transmit to the slave devices 1-3.

The frames transmitted to the slave device 1 from the master device 4 pass by the slave devices 1-3 in sequence. At this point, each slave device reads the transmission indication of the error logs contained in the frames. Besides, the frames are transmitted in the sequence opposite to the path to the slave devices, i.e., according to the sequence of the slave device 3, the slave device 2, the slave device 1 and the master device 4. The master device 4 receives the returned frames, and therefore, the transmission processing of the frames is finished. After reading the transmission indication of the error logs, the slave devices 1-3 contain the error logs recorded per se into the frames and send to the master device 4.

The master device 4 receives the error logs respectively transmitted from the slave devices 1-3, and manufactures the accumulated error logs, the accumulated error logs are the error logs obtained by accumulating the error counting number contained in received the error logs. Hereinafter, the master device 4 performs the transmission indication of the error logs for regulated number of times in a regulated period based on the regulation of the user program. Therefore, the accumulated error logs can be the accumulated error logs based on the regulated period (the number of times of the collected error logs).

In this way, the error monitoring system 100 collects the error counting numbers respectively recorded by the slave devices 1-3 for regulated number of times in a regulated period, and takes the accumulated value of the error counting numbers as the accumulated error logs. Therefore, the master device 4 communicates with the slave devices 1-3 by adopting the EtherCAT communication, i.e., the connectionless communication performed without confirming the target conditions of the data, but can determine what communication error is generated in which device at which frequency. Further, the master device 4 automatically (without input operation of the user) indicates the transmission of the error logs according to the period and the number of times regulated by the user program downloaded to the master device 4 in advance. Therefore, even though the master device 4 and the slave devices 1-3 are in operation on the network, the error logs can be collected or the accumulated error logs can be manufactured without stopping operation.

<Main Part Structure>

Figure 1:
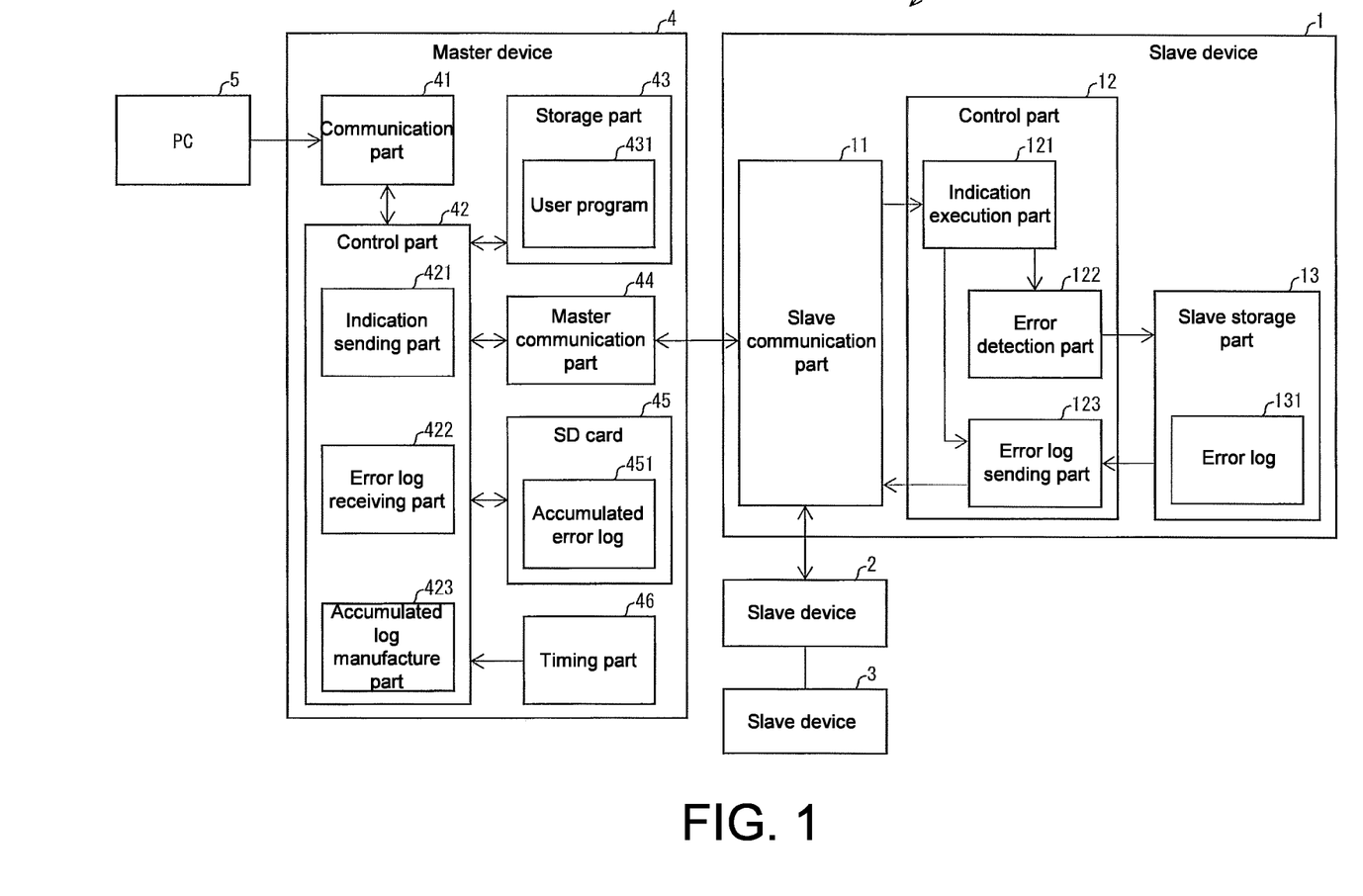
FIG. 1 is a block diagram showing a main part structure of a master device and a slave device contained in an error monitoring system of an embodiment 1 of the present invention.

Next, the main structure part of the master device 4 and the slave devices 1-3 contained in the error monitoring system 100 are explained. FIG. 1 is a block diagram showing a main part structure of a master device and a slave device contained in an error monitoring system 100 of an embodiment 1 of the present invention. In addition, regarding the slave devices 2 and 3, since the structure is same as that of the slave device 1, the illustration and explain of the function blocks are omitted.

(Main Part Structure of the Slave Device 1)

The slave device 1 has a slave communication part 11, a slave control part 12 and a slave storage part 13. The slave communication part 11 is a communication unit configured to perform EtherCAT communication with the master device 4 and other slave devices (the slave device 2 in FIGS. 1-2). The slave storage part 13 is a storage device storing the error logs (error information).

The slave control part 12 uniformly controls the slave device 1. The slave control part 12 receives the start indication as a control command and the transmission indication of the error logs from the master device 4 through the slave communication part 11. In addition, these indication contents are mentioned as follows. Speaking in great details, the slave control part 12 contains an indication execution part 121 (indication receiving part), an error detection part 122 and an error log sending part 123 (information sending part).

The indication execution part 121 enables each part to execute the control command received by the slave control part 12. Specifically speaking, under the condition that the indication execution part 121 receives the start indication from the slave control part 12, the indication is sent to the error detection part 122. Besides, under the condition that the indication execution part 121 receives the transmission indication of the error logs from the slave control part 12, the transmission of the error logs is indicated to the error log sending part 123.

Figure 3:
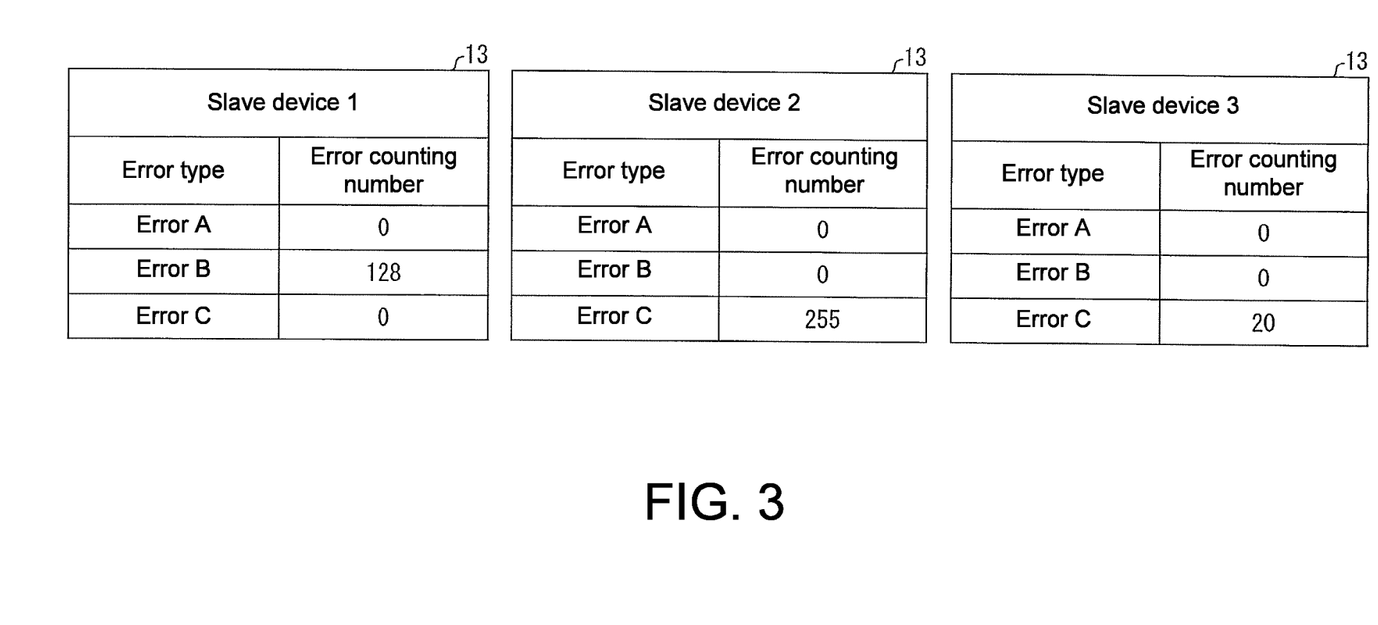
FIG. 3 is a diagram showing an example of a data structure of an error log recorded by the slave device.

The error detection part 122 detects the communication errors in the slave communication part 11, and records the number of occurrence of the communication error as the error log 131. FIG. 3 is a diagram of one example of a data structure of the error log 131. The error log is as shown in the drawing, and represents the information of each type and the number of occurrence (error counting number) of the communication errors generated by each of the slave devices 1-3. In addition, the upper limit of the error counting number (the upper limit of the counting number) only needs to be properly decided.

The error detection part 122 detects the communication errors and manufactures the error log. In addition, the type of the "communication error" herein is not specifically limited, and for example, can be a CRC (Cyclical Redundancy Check) error caused by damage to the frames, the error caused by lose of a link or the like. The error detection part 122 always monitors the slave communication part 11, and determines the type of the error when the communication error is generated, and adds 1 to the corresponding error counting number of the error log 131 stored in the slave storage part 13. Besides, when the error detection part 122 receives the start indication from the indication execution part 121, the error counting number of the error log 131 is all restored to 0 (the error counting number is initialized).

In addition, under the condition that the error detection part 122 detects the CRC error, a mark meaning that the error detection has been performed can be attached to the frame arriving at the slave communication part. Besides, when the frame attached with the mark is read, the error detection parts 122 of the slave devices (being slave devices 2 and 3 under the condition of the present invention) may also not detect the CRC error (the error counting number is not added). Therefore, the CRC error is prevented from being repeatedly detected in the slave devices 2 and 3 at the downstream of the slave device 1.

The error log sending part 123 reads the error log 131 from the slave storage part 13 according to the indication of the indication execution part 121, and transmits to the master device 4 through the slave communication part 11.

(Main Part Structure of the Master Device 4)

The master device 4 contains a communication part 41, a control part 42, a storage part 43 and a master communication part 44, a SD card (Secure Digital card) 45 and a timing part 46. The communication part 46 is a communication unit for communicating with the PC5. The master communication part 44 is a communication unit for performing Ether-CAT communication with the slave device 1. The timing part 56 provides a moment for the control part 42 and a real time clock of the master device 4. The timing part 46 sends the information representing the obtained moment (moment information) to the control part 42.

The storage part 43 stores a user program 431 received by the PC5. Herein, the content of the user program 431 is explained. The user program 431 is a program at least regulating a collecting (i.e., the sending of the transmission indication of the error logs) start moment, a collecting time interval of the error logs and a collecting ending moment of the error logs. In the present embodiment, the user program 431 also contains: "start command" which is a command routine enabling the master device 4 to start to collect the error logs and to transmit the initialized indication command from the master device 4, the initialized indication being used for enabling the slave devices 1-3 to start error detection from 0 (initializing the error counting number); a "circulated value", which is a value regulating the collecting time interval and repeated number of times of the repeated error logs of the master device 4; and a "stop command" which is a command ending a series of error log collecting routines from the start command after the master device 4 collects the error log for the last time.

In addition, the collecting start and end moments of the error logs and the collecting time interval of the error logs can be directly recorded in the user program 431 as a command and variable, and the following structure can also be adopted, that is, the setting information representing the collecting start and end moments and the set collecting time interval is generated by executing the user program 431 and stored in the storage part 43.

Figure 4:
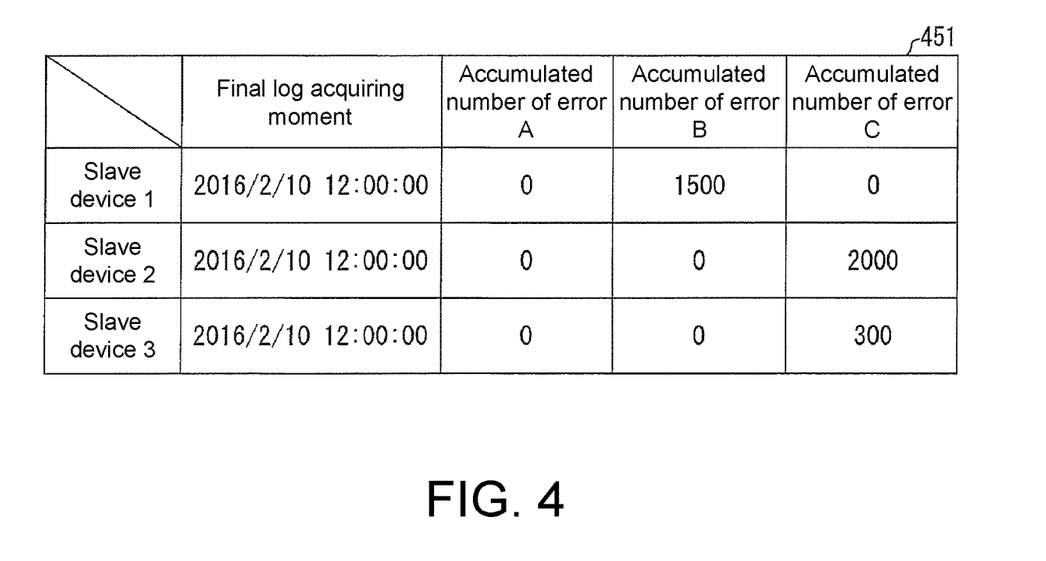
FIG. 4 is a diagram showing an example of a data structure of an accumulated error log manufactured by the master device.

The SD card 45 is a detachable device storing an accumulated log 451. The accumulate log 451 is the log data corresponding the error counting number represented by the error logs to each slave device and accumulating all types corresponding to the errors. Hereinafter, the FIG. 4 is used to explain the specific example of the accumulated log 451. FIG. 4 is a diagram showing the data structure of the accumulated log 451. The accumulated log 451 is as shown in the drawing, and is a log associating the moment (the final log acquiring moment) when each slave device finally collects the error log with the accumulated value of the number of occurrence of various errors. In addition, the final log acquiring moment is the moment timed by the timing part 46. Besides, the form of the FIG. 4 is not limited as long as the accumulated log 451 at least can determine the information of the number of occurrence of various errors corresponding to each slave device. For example, the accumulated log 451 may not comprise the final log acquiring moment.

In addition, the storage part 43 and the SD card can be one storage device. Besides, the SD card 45 may not be detached. For example, the SD card 45 can be built in the device when the master device 4 is shipped out from a factory.

In addition, the control part 42 uniformly controls the master device 4. The control part 42 receives the user program 431 from PC5 through the communication part 41 and stores the data into the storage part 43. After the user program is stored into the storage part 43, when the master device 4 starts to operate in a state of being capable of performing EtherCAT communication with the slave devices 1-3, the control part 42 reads the data of the user program 43 in sequence, and the control command of which the content is regulated by the program is sent to the master communication part 44 at the moment (and period) regulated by the program. Speaking in more details, the control part 42 contains an indication sending part 421, an error log receiving part (information receiving part) 422 and an accumulated log manufacture part (log storage part) 423.

The indication sending part 421 reads the user program 431, manufactures various control commands regulated by the program and sends the sending moment and period regulated by the program to the slave devices 1-3 through the master communication part 44.

More specifically speaking, the indication sending part 421 reads the start command of the user program 431, and transmits a start indication to the slave devices 1-3. Besides, after starting to transmit the indication, the transmission indication of the error logs are transmitted with the time interval and repeated number of times regulated by the circulation value of the user program 431. After the transmission indication of the error logs of the number of times regulated by the circulated value is transmitted, the indication sending part 421 reads the stop command of the user program 431, transmits the transmission indication of the error logs for the last time and ends the series of collecting routines of the error logs.

In addition, under the condition that the setting information generated by executing the user program 431, as long as the indication sending part 421 refers to the setting information stored in the storage part 43 to perform the collecting routine of the error logs with the collecting start and end moments and the collecting time interval represented by the setting information.

The error log receiving part 422 receives the error log 131 contained in the frames transmitted by the slave devices 1-3 through the master communication part 44. When receiving the error log 131, the error log receiving part 422 sends the error log 131 to an accumulated log manufacture part 423.

The accumulated error log manufacture part 423 receives the error log 131 from the error log receiving part 422 and stores the error counting number of each type of error and represented by the error logs to the value corresponding to the accumulated log 451 stored in the SD card 45. That is, the accumulated log 451 is updated. In addition, under the condition that the accumulated log 451 is not manufactured, the accumulated log manufacture part 423 generates the accumulated log.

<Processing Flow>

Figure 5:
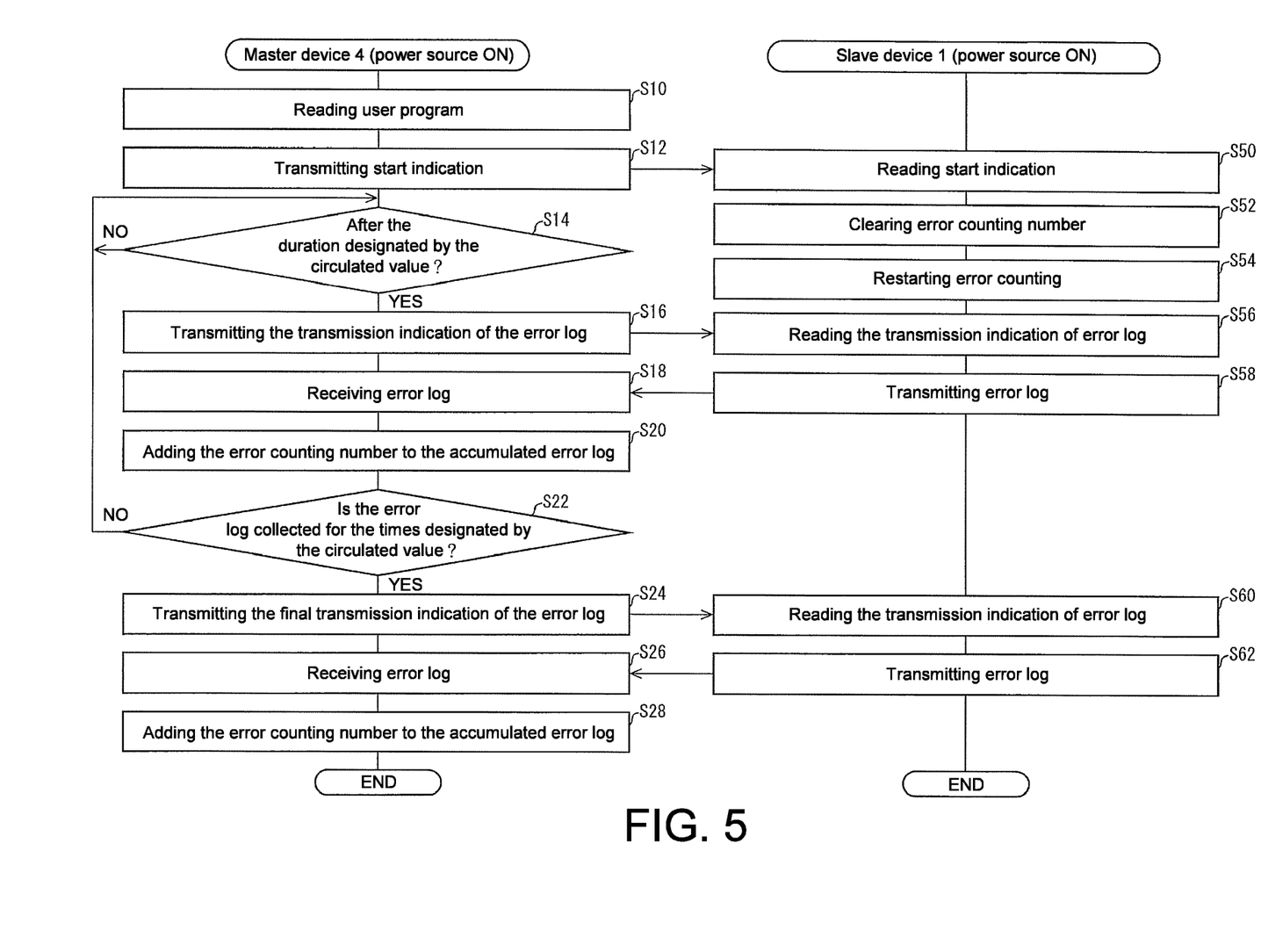
FIG. 5 is a flow chart showing a collecting and processing flow of the error logs of the master device and the slave device.

Finally, the processing flow in the error monitoring system 100 is explained. FIG. 5 is a flow chart showing a collecting and processing flow of the error logs of the master device 4 and the slave devices 1-3. In addition, since the processing flow of the slave devices 2 and 3 at the downstream of the slave device 1 is same, FIG. 5 only records the processing flow of the slave device 1.

When the power source is ON under the condition that the master device 4 is connected to the industrial network for operating production devices and the like, the sequence control of each slave device is started. The control part 42 of the master device 4 reads the user program 431 (S10) stored in the storage part 43 and executes the command. The indication sending part 421 enables the start indication in the frames to transmit to the slave devices 1-3 (S12) when the moment regulated by the user program 431 arrives. The slave control parts 12 of the slave devices 1-3 read the start indication from the frames passing by the slave communication parts 11 (S50), and the indication execution parts 121 send the start indications to the error detection part 122. When the error detection part 122 initializes the error counting number of the error log 131 stored in the storage part 13 when receiving the start indication (S52). After initialized, the error counting of the error detection part 122 restarts immediately.

The control part 42 of the master device 4 determines the collecting period (time interval and collecting number of times) of the error logs regulated by the circulated value by referring to the circulated value regulated by the user program 431. Then, the indication sending part 421 is standby in the period designated by the circulated value from the moment of sending the star indication to the moment of receiving the initial error log [standby during the period regulated by the circulated value] (No in S14). After the period designated by the circulated value (Yes in S14), the indication sending part 421 enables the error logs to be contained in the frames to transmit to the slave devices 1-3 (S16, indication sending step). The slave control parts 12 of the slave devices 1-3 read the transmission indication of the error logs from the frames passing by the slave communication part 11 (S56), and the indication execution part 121 sends the log transmission indication to the error log sending part 123. The error log sending part 123 transmits the error log 131 stored in the slave storage part 13 to the master device 4 when receiving the transmission indication of the error log (S58).

The master device 4 sends the error log 131 to the accumulated log manufacture part 423 when the slave devices 1-3 receive the error log 131 respectively (S18, information receiving step). The accumulated log manufacture part 423 reads the error counting number by corresponding the error log 131 of each slave device to each type of the error, and adds (totalizes) the error counting number to the accumulated log 451 stored in the SD card 45 (S20, log storing step).

The processing of the S14-S20 at the side of the master device 4 and the processing of S56-S58 at the side of the slave devices 1-3 repeatedly designate number of times with the time interval designated by the circulated value regulated by the user program 431 (no in S22). After transmitting the transmission indication of the error logs of the number of times designated by the circulated value (yes in S22), the indication sending part 421 reads the stop command of the user program 431, and transmits the error log transmission indication for the last time (S24, indication sending step), and the slave devices 1-3 read the transmission indication of the error logs (S60) like S56 and S58, and transmit the error log 131 to the master device 4 (S62). The error log receiving part 422 of the master device 4 respectively receives the error log 131 from the slave devices 1-3 (S26, information receiving step), and the accumulated log manufacture part 423 adds the error counting number represented by the error log 131 to the accumulated log 451 (S28, log storing step). The indication sending part 421 ends the series of processing when the accumulated log manufacture part 423 ends the adding of the final error counting number.

According to the above processing, the error monitoring system 100 collects the error counting number respectively recorded by the slave devices 1-3, for regulated number of times in a regulated period and records to be the accumulated error log. Therefore, Therefore, the master device 4 can qualitatively and quantitatively monitor the generation of the communication errors without stopping operation.

(Variable)

In addition, the slave devices 1-3 of the present invention can also have the slave timing part. At this point, when transmitting the error log 131 to the master device, the error log sending part 123 of the slave control part 12 can also associate the moment, as the log sending moment, supplied from the slave timing part with the error log for transmission. Further, the accumulated error manufacture part 423 of the master device 4 can also enable the log sending moment to be contained the accumulated log to replace the final log acquiring moment when manufacturing the accumulated log.

In addition, the error log detection part 122 may not monitor the slave communication part 11 always, and can start the monitoring (error detection) of the slave communication part 11 together with the initialization of the error counting number after receiving the start indication from the indication execution part 121. At this point, when transmitting the transmission indication of the error log corresponding to the stop command, the master device 4 adds the ending information representing that the transmission of the error log is the last to transmit to the slave devices 1-3. Besides, when receiving the transmission indication of the error log attached with the ending information, the indication execution part 121 of the slave control part 12 can also enable the error log sending part 123 to send the error log and indicates the error detection part to stop the error detection. Besides, when the error detection part 122 receives the indication of stopping the error detection, the monitoring on the communication error of the slave communication part 11 can also be stopped.

Further, at this point, the error detection part 122 can also initialize the error counting number of the error log 131 after the final error log of the error log sending part 123 is sent under the condition of receiving the stop indication instead of the condition receiving the start indication.

[Embodiment by Means of Software]

The control blocks of the master device 4 and the slave devices 1-3 (especially respective function blocks of the control part 42 and the slave control part 12) can be realized by a logic circuit (hardware) on an IC (integrated circuit chip), etc., and can also be realized by using a CPU (Central Processing Unit) through software.

Under the latter condition, the master device 4 and slave devices 1-3 have a CPU having the software realizing each function, i.e., the command of the program, an ROM (Read Only Memory) or storage device (or called as recording medium) capable of being read by the computer (or CPU) and recording the program and various data, and an RAM (Random Access Memory) developing the program, etc. The program is read and executed by the computer (or CPU) to achieve the purpose of the present invention. As the recording medium, "a non-temporary visible medium" can be used, for example, a tape, a disk, a card, a semiconductor memory, a programmable logic circuit, etc., can be used. Besides, the program can be provided for the computer through any transmission medium (communication network or broadcast waves, etc.) capable of transmitting the program. In addition, the present invention can also be realized in the form of data signals embodying the program by electronic transmission and embedding into carriers.

The present invention is not limited to the mentioned respective embodiments, and can be altered in the range shown by the claims, and the embodiments obtained by suitably combining the technical parts respectively disclosed in different embodiments also fall within the technical scope of the present invention.

What is claimed is:

1. A master device, the master device configured to communicate with a plurality of slave devices by a connectionless communication mode, wherein the plurality of slave devices detect whether a communication error between the each of the plurality of slave devices and the master exists, the master device comprising:
   a storage device; and
   a processor configured to control collection of an error information from the plurality of slave devices by:
      monitoring a current time;
      sending, based on the monitored current time being equal to a predetermined collecting start time, a start request to enable the plurality of slave devices to collect the error information, wherein the error information represents whether the communication error exists;
      responsive to sending the start request, starting a predetermined time interval;
      sending, based on the monitored current time being equal to a predetermined collecting end time, a transmission request to request the plurality of slave devices to transmit the error information collected during the predetermined time interval to acquire the collected error information from the plurality of slave devices;
      receiving the collected error information sent from the plurality of slave devices respectively after the predetermined time interval in response to the transmission request; and
      storing the error information corresponding to each slave device into the storage device.

2. The master device according to claim 1, wherein the processor receives a number of occurrence of the communication error detected from the slave devices as the error information.

3. The master device according to claim 2, wherein the processor is further configured to store an accumulated value of the number of occurrence of the communication error.

4. The master device according to claim 1, wherein the processor is further configured to establish correspondence between the error information and a time point when the error information is received or a time point when the error information is acquired from the slave devices for storage.

5. The master device according to claim 1, wherein the processor is further configured to receive the error information of each type of the communication error from the slave devices, and
   store the error information corresponding to each type of the communication error.

6. The master device according to claim 1, wherein the storage device stores the collecting start time and the collecting end time and the predetermined time interval, and
   the process is configured to periodically send the start request at the predetermined time interval, and ends the periodically sending the start request when the current time equals to the collecting end time.

7. An error monitoring system, comprising
   the master device according to claim 1; and
   the plurality of slave devices,
   wherein the slave device detects whether a communication error exists and communicates with the master device in a connectionless communication mode, and
   the slave device comprising:
   a processor configured to have collection of an error information controlled by the master device by:
      receiving the start request to collect the error information, wherein the error information represents whether the communication error, and sending, to the master device, the collected error information after the predetermined time interval in response to the transmission request to be stored by the master device.

8. A non-transitory computer readable medium, storing computer readable instructions for causing, when executed by a processor of a computer, the computer to function as the master device according to claim 1, wherein the processor functions as the indication sending circuit, the information receiving circuit, and the log storing circuit when the computer readable instructions are executed.

9. The master device of claim 1, wherein the processor is further configured to initialize and reset an error counting number of error log stored in the storage device of the corresponding slave device upon receiving of the indication.

10. The master device of claim 1, wherein after the predetermined period has elapsed, the processor is further configured to:
   send a transmission indication to the slave devices for requesting an error log of the slave devices to be transmitted from the slave devices to the master device; and
   add an error count indicated in the received error log of the slave devices to the accumulated error log stored in the master device.

11. The master device of claim 1, wherein the master device is a programmable logic controller (PLC) for sequence control of automation, and the slave devices are drivers for controlling motor or lamp.

12. A slave device, the slave device being one of a plurality of slave devices configured to communicate with a master device by a connectionless communication mode, wherein the plurality of slave devices detect whether a communication error exists between each of the plurality of slave devices and the master, the slave device comprising:
   a processor configured to have collection of an error information controlled by the master device by:
      receiving, from the master device based on a current time monitored by the master device being equal to a predetermined collecting start time, a start request to enable the slave device to collect the error information, wherein the error information represents whether the communication error exists and wherein the master device starts a predetermined time interval;
      receiving, from the master device based on the monitored current time being equal to a predetermined collecting end time, a transmission request to request the slave devices to transmit the error information collected during the predetermined time interval to provide the master device with the collected error information; and
      sending, to the master device, the collected error information after the predetermined time interval in response to the transmission request to be stored by the master device.

13. A control method of a master device, wherein the master device is configured to communicate with a plurality of slave devices by a connectionless communication mode, wherein the plurality of slave devices detect whether a communication error between each of the plurality of slave devices and the master device exists, and the control method of a master device comprising:
   monitoring a current time;
   sending, based on the monitored current time being equal to a predetermined collecting start time, a start request to enable the plurality of slave devices to collect the error information, wherein the error information represents whether the communication error exists;
   starting a predetermined time interval in response to the sending of the start request;
   sending, based on the monitored current time being equal to a predetermined collecting end time, a transmission request to request the plurality of slave devices to transmit the error information collected during the predetermined time interval to acquire the collected error information from the plurality of slave devices;
   receiving the collected error information sent from the plurality of slave devices respectively after the predetermined time interval in response to the transmission request; and
   storing the error information corresponding to each slave device into the storage device.

* * * * *